(12) United States Patent
Hahn et al.

(10) Patent No.: US 7,136,754 B2
(45) Date of Patent: Nov. 14, 2006

(54) FREE SPACE MONITORING SYSTEM FOR MOTOR VEHICLES

(75) Inventors: Stefan Hahn, Ulm (DE); Christian Friedrich Toepfer, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 215 days.

(21) Appl. No.: 10/822,513

(22) Filed: Apr. 12, 2004

(65) Prior Publication Data
US 2004/0220724 A1 Nov. 4, 2004

(30) Foreign Application Priority Data
Apr. 11, 2003 (DE) ................. 103 17 044

(51) Int. Cl.
*G01C 21/26* (2006.01)
(52) U.S. Cl. ...................... 701/301; 340/435
(58) Field of Classification Search .............. None
See application file for complete search history.

(56) References Cited
U.S. PATENT DOCUMENTS 5,545,960 A * 8/1996 Ishikawa ............... 318/587
6,170,591 B1 * 1/2001 Sakai et al. ............. 180/204
6,366,221 B1 * 4/2002 Iisaka et al. ............ 340/932.2
2001/0010540 A1 8/2001 Hiroyuki
2004/0181338 A1 * 9/2004 Dobler et al. ............. 701/301

FOREIGN PATENT DOCUMENTS

| DE | 101 03 924 A | 8/2001 |
| EP | 1 065 642 A | 1/2001 |
| EP | 1 170 172 A | 1/2002 |
| WO | WO 03/001471 A2 * | 1/2003 |

* cited by examiner

*Primary Examiner*—Michael J. Zanelli
(74) *Attorney, Agent, or Firm*—Akerman Senterfitt; Stephan A. Pendorf; Yonghong Chen (57) ABSTRACT

In complex vehicle maneuvers it is often difficult for the driver of the motor vehicle to estimate along which tract the vehicle will move and how much free space is necessary in order to avoid collision. A process is provided for monitoring the environment space in the direction of travel of the own vehicle, in which image data of the environment around the vehicle in the direction of travel of the vehicle is recorded using a camera system the three-dimensional free space required for unimpeded travel is calculated in advance in a signal processing unit and the vehicle operator is informed regarding whether or not a sufficient free space is available to him for unimpeded travel.

21 Claims, 9 Drawing Sheets

FREE SPACE MONITORING SYSTEM FOR MOTOR VEHICLES

BACKGROUND OF THE INVENTION

1. Field of Invention

The invention concerns a process and device for monitoring the free space in the direction of travel of a vehicle according to the precharacterizing portion of patent claims 1 and 10.

2. Related Art of the Invention

In complex vehicle maneuvers it is often difficult for the driver of the motor vehicle to predict the precise track of the vehicle and to know how much free space will be needed in order to avoid collision. This is the case in particular when the vehicle operator is not familiar with the dimensions or the maneuvering characteristics of the vehicle.

In order to support the vehicle operator during difficult driving maneuvers, an operator information system has been developed as described in Japanese Published Application JP 2000-67395 A, wherein image data describing the roadway have predicted vehicle tracks superimposed thereupon. In this manner it becomes possible for the vehicle operator to better estimate the future behavior of his vehicle. To do this the system uses the data of two sensors, which are mounted on the front wheels of the vehicle and therewith provide information regarding the direction of motion and the speed of the vehicle. From the sensor data a future vehicle track is predicted and this is superimposed as a line structure of a depiction of the vehicle track in a display unit. A disadvantage with such a system is that the predicted vehicle track is superimposed only upon a display of the vehicle roadway or route, with no images embedded in the display providing the operator information regarding objects in the vicinity of the vehicle.

In order to provide the vehicle operator an improved overview over the actual environment of the vehicle and to allow better maneuvering therein, an improved environment monitoring system is proposed in Patent Application EP 1 158 803 A2. Herein the situation of the environment of the vehicle is detected using multiple camera systems, with data transformed into a birdseye view. Into this image a vehicle system representing the vehicle is embedded in a position corresponding to the vehicle position. The vehicle symbol is herein so designed, that it fits into the environment image with its correct size relationship. The image information provided to the vehicle operator thus corresponds to the view from the point above the vehicle looking down onto the environment; that is, the vehicle and its environment are represented in a type of birdseye perspective. In order to support the vehicle operator in his evaluation of the future travel path of the vehicle, the image has superimposed thereon a three dimensional line contour describing the predicted vehicle path of travel. The line contour represents the image of an edge or frame of a rectangle, which is curved along the predicted path of travel. The two lower longitudinal edges of the rectangle lie on the vehicle path of travel and correspond substantially to the vehicle track represnted in JP 2000-67395 A. The height and breadth of the rectangle is herein selected to be smaller than height and breadth of the vehicle. The vehicle operator obtains by this mode of representation on the one hand a good depiction of the future relationship of the vehicle to its environment; however, due to the perspective of representation which is unconventional for the vehicle operator it is not possible for him, in simple manner to grasp the danger of collision, which would be attributable to the parts projecting from the vehicle sides into the area of the predicted vehicle path of travel. In particular, the parts projecting into the predicted vehicle path from above can only be represented and recognized with difficulty. It is also not possible to represent for the vehicle operator thoroughfares (tunnels or entryways, garages) in a plausible or intuitively understandable manner.

SUMMARY OF THE INVENTION

It is thus the task of the invention to provide a process and a device which makes possible for the operator of a vehicle to envision the future vehicle path of travel with regard to its environment, and to reliably recognize dangers of collision due to parts projecting from the side or upwards into the predicted vehicle path of travel.

This task is solved by a process and a device with the characteristics of the independent claims.

Advantageous embodiments and further developments of the invention can be seen from the dependent claims.

In a process for monitoring the environment space in the direction of travel of the own vehicle, image data of the environment around the vehicle in the direction of travel of the vehicle is recorded using a camera system. Further, the three dimensional free space required for unimpeded travel is calculated in advance in a signal processing unit on the basis of the operating parameters and the dimensions of the vehicle. The operator of the motor vehicle thus has displayed to him in a display at least those parts of the image data obtained from the camera system and corresponding to the area of the required free space. In inventive manner, the image data are herein displayed substantially from a perspective which would represent the environment in the path of travel of the vehicle from the direct perspective of the operator of the vehicle. Further, in inventive manner the image data associated with the required free space is subjected to a further processing, whereby as a result of this further processing, the vehicle operator is informed regarding whether or not a sufficient free space is available to him for unimpeded travel. It is thus possible therewith, in inventive manner, by a continuous evaluation of the image data, to automatically react to a dynamic change in the vehicle environment and to inform the vehicle operator as to whether a sufficient free space is still available or not for unimpeded travel. By the display of at least the part of the image data representing the required free space, the vehicle operator has the possibility of independently assessing and evaluating the potential of danger in the predicted path of travel. The display of the image data occurs therein not in the perspective of the representation according to the systems known in the state of the art, in which information is presented as viewed from above (birdseye view), but rather essentially from the perspective wherein the environment around the vehicle would appear to the vehicle operator as it would in his own direct view in the direction of travel. It is herein however also conceivable, that the depiction of the vehicle environment, in particular as dictated by the optics of the camera system (for example, wide-angle lens or catadiopter camera lens), is displayed distorted. On the other hand it is however also very conceivable, that in the framework of the further data processing any warping or distortion of the image data is corrected. In a manner which is understandable to him, the vehicle operator sees an image depicting the environment, of which the perspective substantially corresponds with that of his own view, as he would himself perceive by directly looking out of the window. It is thus no longer necessary that the vehicle operator take the unaccustomed birdseye view perspective representation and to convert it into the real conditions.

Data regarding the dimensions of the vehicle are stored in a memory, and is accessible to the signal processing unit, in order, with the aid of the operating parameters of the vehicle, to be able to estimate the necessary driving space for the driving maneuver. Therein there is the possibility that the dimensions stored in the memory do not correspond with the actual dimensions of the vehicle, but rather are expanded by a certain safety margin. One such safety margin could in advantageous manner be up to 20 centimeters. It is also conceivable that this safety margin is manipulated by the signal processing unit to be variable and, depending upon the vehicle operating speed and/or danger potential, that it becomes enlarged or reduced. It is also possible that the safety margins are variously adjusted for the various areas or parts of the vehicle. Thus it is for example conceivable that the safety distance from bumpers is set smaller than that for the contact-sensitive rear-view mirrors.

In inventive manner, this memory for recording the vehicle dimensions is so arranged and organized, that therein there are stored a multiplicity of data sets having different vehicle dimensions, which can be individually selected by a targeted selection, and provided to the signal processing. The memory can also be provided with a means, by which at least one of the data sets stored in the memory can be changed out. This provides the advantage, that the system for monitoring environmental free space is relatively easy to adapt to changes (for example in the vehicle contour, e.g. new trailer, different vehicle superstructure, etc.). Precisely such a design is of great advantage above all in the case of operation of a fleet of vehicles, in particular trucks with variable superstructures. In this way even electro-technologically unsophisticated operating personnel can operate the inventive system using simple input elements. They can do this without change of electro-technological components or connecting with or operating programming devices.

In particularly preferred manner these changes in the dimensions of the vehicle can also be assumed or incorporated in simple manner in the memory associated with the signal processing device, in that the data set describing the new dimensions are read into the memory in simple manner via a mobile or stationary data transmission unit using a suitable interface. In particularly advantageous manner, in the case of a suitable design of the system the inputting and the selection of data sets can also occur wirelessly, via a communication device. In the case of frequent repetitive (identical) changes (for example driving with loaded or as the case may be unloaded container) it also possible that multiple various vehicle contours or dimensions are stored in memory of the data processing unit, and can be called up at will. In particular, a keypad accessible by the vehicle operator can be provided for this purpose. In particularly simple and useful manner, this keypad has individual keys associated with the data sets stored in memory, so that with a single key stroke selection the desired data set can be called up.

BRIEF DESCRIPTION OF THE DRAWINGS

In the following the invention will be described in greater detail on the basis of the illustrated embodiment shown in the figures.

DETAILED DESCRIPTION OF THE INVENTION

After the path of travel and the therefore required free space has been predicted by the signal processing unit, it is particularly advantageous when in the framework of the further processing of the image data any dynamic time-based changes of this data are taken into consideration. In this manner the system can recognize objects or persons which enter into the free space required for the vehicle maneuver. If this is the case, then the operator of the vehicle should be informed in an appropriate manner that sufficient free is no longer available. This information can occur in particular by optical, acoustic or haptic perceivable signal-providers. On the other hand, it is also conceivable that the image data displayed to the vehicle operator of objects or persons representing an impediment in the free space would be represented visually in enhanced or accentuated form. For this, there is suitable for example a color enhancement or false color accentuation of the display, in particular a false-color representation, increasing in steps depending upon the danger of collision (for example: high collision danger→object is colored red; slight danger of collision→object is colored yellow). In particularly preferred manner the objects or persons representing an impediment could also be highlighted in the manner that symbols are superimposed thereon. For example, in the framework of the further processing of the image data, objects which have moved are detected by means of an image processing algorithm based upon the optical flow, then in suitable manner the moved object can have superimposed symbolic movement vectors (arrows) which describe the direction of movement and movement speed (length of the arrow).

A particularly advantageous mode and manner of informing the vehicle operator regarding the amount of free space available to him is comprised therein, that in the framework of the further processing of the image data, the image data displayed to the vehicle operator has superimposed a symbolic representation of the boundary limits of the required free space as predicted in the signal processing unit. Therein it is particularly advantageous to describe the edge boundaries by walls represented symbolically. The height of the walls corresponds therein to the height of the required free space (that is, essentially the dimensions stored in memory regarding the maximum height of the vehicle).

In particularly advantageous manner the edge boundaries are so represented that the required free space is bordered by a type of "driving tube" or "driving tunnel"; for this, the edge boundaries occur by symbolic represented walls and the overhead area in the manner of a tube. By this "tube view" the attention of the vehicle operator is specifically directed, and it also becomes possible for him with greater ease to substantially recognize objects which project into the needed free space from above or from the sides.

For the driver, the estimation of whether spatially fixed objects extend into the rearward free space becomes particularly simple when, during the (backwards) travel, he can compare the relative movement of objects in the image (display) with the relative movement of a spatially fixed symbolic driving tube: if the objects move faster than the boundaries of the driving tube, then they are spatially closer—that is—within the direct area of danger. If during travel they move slower through the image, then they are outside of the driving tube and there is no danger that they will be contacted during further driving. For this reason it is advantageous to so design the walls and overhead, and in certain cases even the floor, of the symbolic shown tube, such that it 1.) has a geometrically clear and distinct identifiable structure (for example: grid pattern, checkerboard pattern or series of columns)
2.) provides a "through view" to the video scene lying there-behind (for example: broken away or semi-transparent structures of the walls and/or the ceiling).
3.) is respectively so calculated or, as the case may be, determined based on the vehicle movement, that it remains stationary in the longitudinal direction.

In order to make the superimposition of the camera image with the symbolic depiction of the edge boundaries of the required free space appear as realistic as possible, the image characteristics (transformation equations) of the camera image are to be taken into consideration. For a better understanding, in particular with regard to the realization of the advantageous design introduced above under point 3 (standing still in the longitudinal direction) of the graphic overlay, in the following there will be discussed as an example the necessary transformation equations for the superposition of an image recorded by means of a catadioptric camera (omnicam) with a parabolic mirror. Therein, the basic steps and, in detail, the individual steps, of the transformation equation are explained and elaborated, which are necessary for the inventive superimposition of the camera image with the edge boundaries of the required free space.

Of course the invention is not limited to the employment of such a camera, but rather necessary transformations explained on the basis of this camera geometry in detail allow themselves to be directly applied in simple manner to other camera systems with other mapping or transformation characteristics.

Coordinate Systems

The coordinate systems used herein follow the conventions from the literature regarding optical flow. In the 3D-camera coordinate system the Z-axis indicates the direction of view, the X-axis to the right and the Y-axis downwards. The center image coordinates are provided by an x-axis towards the right and a y-axis directed downwards. The origin of both coordinate systems is the center of the image.

Regarding Environment-to-Vehicle Coordinates

Figure 3:
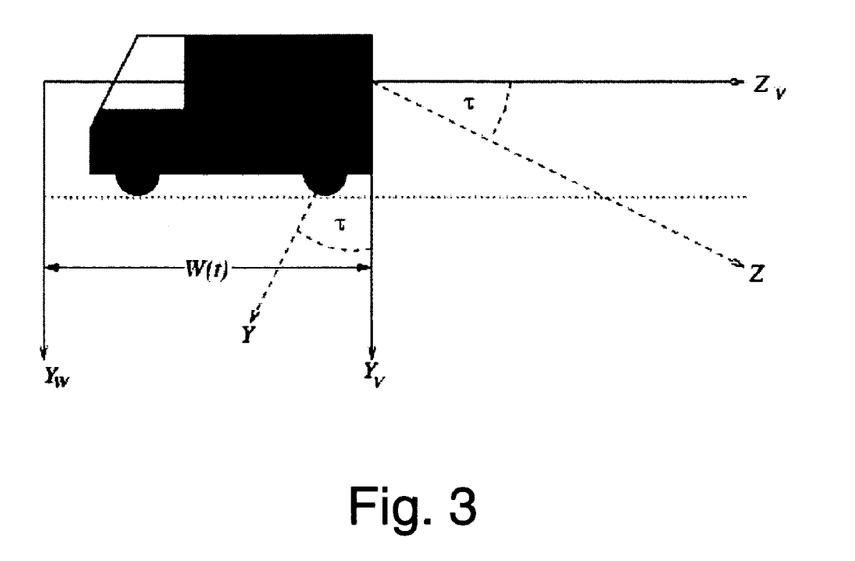
FIG. 3 shows the relationship of the global coordinate system to the vehicle coordinate system.

For a camera mounted on a moving vehicle, one can first introduce two important coordinate systems: an environment coordinate system, in which the vehicle environment exists, and a vehicle coordinate system, which moves along with the vehicle, see FIG. 3. When the vehicle moves in the direction of the $Z_W$-axis, the transformation between these two coordinate systems is described by the position W(t) of the vehicle in the environment coordinate system:

$$\begin{pmatrix} X_V \\ Y_V \\ Z_V \end{pmatrix} = \begin{pmatrix} X_W \\ Y_W \\ Z_W \end{pmatrix} - \begin{pmatrix} 0 \\ 0 \\ W(t) \end{pmatrix} \quad (1)$$

The instantaneous speed of the vehicle is V=W. Therewith, the time derivation of the point in which the vehicle environment rests is:

$$\begin{pmatrix} \dot{X}_V \\ \dot{Y}_V \\ \dot{Z}_V \end{pmatrix} = \begin{pmatrix} 0 \\ 0 \\ -V \end{pmatrix} \quad (2)$$

Regarding Vehicle-to-Camera Coordinates

It is shown in FIG. 3 that the direction of view of the camera is tilted about an angle $\tau$ against the (backwards) direction of movement. In this case the transformation of vehicle to camera coordinates occurs as follows:

$$\begin{pmatrix} X \\ Y \\ Z \end{pmatrix} = \begin{pmatrix} 1 & 0 & 0 \\ 0 & \cos\tau & -\sin\tau \\ 0 & \sin\tau & \cos\tau \end{pmatrix} \cdot \begin{pmatrix} X_V \\ Y_V \\ Z_V \end{pmatrix} \quad (3)$$

$$\begin{pmatrix} X_V \\ Y_V \\ Z_V \end{pmatrix} = \begin{pmatrix} 1 & 0 & 0 \\ 0 & \cos\tau & \sin\tau \\ 0 & -\sin\tau & \cos\tau \end{pmatrix} \cdot \begin{pmatrix} X \\ Y \\ Z \end{pmatrix} \quad (4)$$

In the general case, these transformations contain not only the tilt angle $\tau$, but rather the three Euler angles.

From Equation 2 one obtains the movement of a stationary point in the camera coordinates $$\dot{X} = 0 \quad (5)$$

$$\dot{Y} = V \sin \tau \quad (6)$$

$$\dot{Z} = -V \cos \tau \quad (7)$$

Polar Camera Coordinates

The arc tan (y,x)—function with two arguments determines the phase of the complex number x+iy in the value range $[-\pi, \pi]$. The sequence of the arguments were selected following the standard or paradigm of the ANSI-C function a tan 2.

Transformation of polar into Cartesian coordinates:

$$X = R \sin \theta \cos \phi \quad (8)$$

$$Y = R \sin \theta \cos \phi \quad (9)$$

$$Z = R \cos \theta \quad (10)$$

Transformation of Cartesian into polar coordinates:

$$R = \sqrt{X^2 + Y^2 + Z^2} \quad (11)$$

$$\theta = \arctan(\sqrt{X^2 + Y^2}, Z) \quad (12)$$

$$\phi = \arctan(Y, X) \quad (13)$$

Polar Image Coordinates

Transformation of polar into Cartesian coordinates:

$$x = r \cos \phi \quad (14)$$

$$y = r \sin \phi \quad (15)$$

Transformation of Cartesian into polar coordinates:

$$r = \sqrt{x^2 + y^2} \quad (16)$$

$$\phi = \arctan(y, x) \quad (17)$$

Point of Intersection of Direction of View with Plane of Object Space

The vector of the direction of view w is provided in the vehicle coordinates. In the case $w_1 \neq 0$, the beam cuts through or intersects the plane $X_V = a$ at the point $$p = \frac{a}{w_1} w \quad (18)$$

In the case $w_2 \neq 0$, the beam intersects the plane $Y_V = b$ at the point $$p = \frac{b}{w_2} w \quad (19)$$

In the case $w3 \neq 0$, the beam intersects the plane $Z_V = c$ at the point $$p = \frac{c}{w_3} w \quad (20)$$

Omnicam Transformation for Image or Mapping or Picture Mirror Form

The transformation through the omnicam modeled here occurs in two steps: a reflection in a parabolic mirror occurs from an orthographic image.

The parabolic mirror surface with a focal length f is defined by $$z = f - \frac{x^2 + y^2}{4f}. \quad (21)$$

This expression is used in many of the following equations. That means, in those cases z is for the term on the right side of the equation, which depends from the position (x, y).

Since the focus of the parabola originated in coordinate data, the direction of view at the image point (x, y) is defined by $$s(x, y) = \begin{pmatrix} x \\ y \\ z \end{pmatrix} = \begin{pmatrix} x \\ y \\ f - \frac{x^2 + y^2}{4f} \end{pmatrix} \quad (22)$$

The derivation of the parabolic equation (21) is then $$\frac{dz}{dx} = -\frac{x}{2f} \quad (23)$$

$$\frac{dz}{dy} = -\frac{y}{2f} \quad (24)$$

That means, the normal vector on the mirror surface has the direction $$m(x, y) = \begin{pmatrix} x \\ y \\ 2f \end{pmatrix} \quad (25)$$

Therein it is not postulated or claimed that s(x, y) or m(x, y) are unity vectors.

Projection of Points

The omnicam image is represented most simply in polar coordinates:

$$r = 2f \tan \frac{\theta}{2} \quad (26)$$

Figure 4:
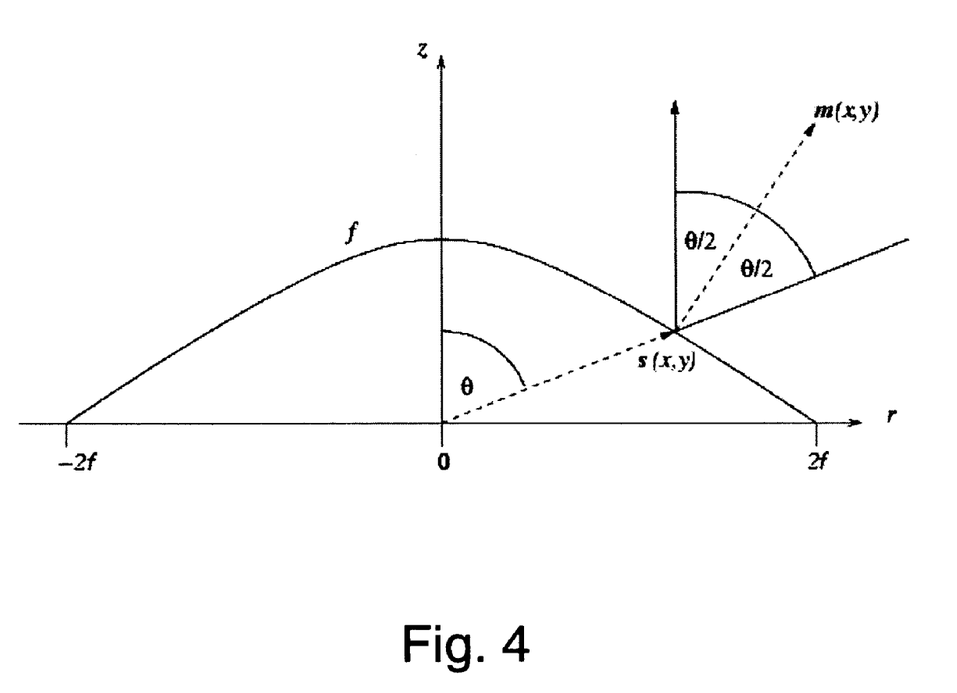
FIG. 4 shows the image geometry of a parabolic mirror.

As discussed above, $\tau$ is the distance from the image center, measured in pixels. $\theta$ is the angle of the image direction to the optical axis. This relationship can be derived with the aid of FIG. 4 and Equation (25). The azimuth $\phi$ is the same in the camera and image coordinates.

In Cartesian coordinates this means $$x = \frac{2fX}{R + Z} = \frac{2fX}{\sqrt{X^2 + Y^2 + Z^2} + Z} \quad (27)$$

$$y = \frac{2fY}{R + Z} = \frac{2fY}{\sqrt{X^2 + Y^2 + Z^2} + Z} \quad (28)$$

Projection of Lines

A straight line in the space is defined by a point p and a direction $l = (l_1, l_2, l_3)^t$ with $\|l\| = 1$. The vector $n = p \times l$ is perpendicular to the plane, which is spanned by the straight line and origin of the camera coordinates. The camera components of n determine the type of the omnicam image of the 3D-lines:

in the case n=0, the line cuts through or intersects the origin and its image is a point with the coordinates $$x = \frac{2fl_1}{1+l_3} \quad (29)$$

$$y = \frac{2fl_2}{1+l_3} \quad (30)$$

in the case n≠0, however $n_3$=0, then the 3D-line parallel to the optical axis and its image is a 2D-line through the image center with the equation $$n_1 x + n_2 y = 0 \quad (31)$$

in the other case, the image of the line is a arch or circle segment with the center point $(x_c, y_c)$ with a radius r:

$$x_c = 2f n_1 / n_3 \quad (32)$$

$$y_c = 2f n_2 / n_3 \quad (33)$$

$$r = 2f |n_1| / n_3 \quad (34)$$

Distance from Plane

The length of the vector s(x,y) from Equation 1 (22) is $$|s(x, y)| = \sqrt{x^2 + y^2 + z^2} = f + \frac{x^2 + y^2}{4f} = 2f - z \quad (35)$$

Thus, a point with the distance R with the image position (x,y) has the camera coordinates $$\begin{pmatrix} X \\ Y \\ Z \end{pmatrix} = R \frac{s(x, y)}{|s(x, y)|} \quad (36)$$

This produces a compact relationship between the camera coordinates of the object point on the one hand as well as distance R an image position (x,y) on the other hand:

$$\begin{pmatrix} X \\ Y \\ Z \end{pmatrix} = \frac{R}{2f - z} \begin{pmatrix} x \\ y \\ z \end{pmatrix} \quad (37)$$

or in greater detail $$\begin{pmatrix} X \\ Y \\ Z \end{pmatrix} = \frac{R}{4f^2 + x^2 + y^2} \begin{pmatrix} 4fx \\ 4fy \\ 4f^2 - x^2 - y^2 \end{pmatrix} \quad (38)$$

The distance of a perpendicular wall with the equation X=a is provided for an image point (x,y) by $$R(x, y) = \frac{2f - z}{x} a \quad (39)$$

or in greater detail $$R(x, y) = \frac{4f^2 + x^2 + y^2}{4fx} a \quad (40)$$

In the case a<0 the wall is visible only on the left side of the image (x<0), and the reverse. A horizontal plane has the equation $Y_V$=b in the environment coordinate system. With equation (4) the camera coordinates can be transformed $$Y \cos \tau + Z \sin \tau = b \quad (41)$$

Introduced into equation (38):

$$R(x, y) = \frac{2f - z}{y \cos \tau + z \sin \tau} b \quad (42)$$

or in greater detail $$R(x, y) = \frac{4f^2 x^2 + y^2}{4fy \cos \tau + (4f^2 - x^2 - y^2) \sin \tau} b \quad (43)$$

In the case b>0, the plane is visible only below the horizon.

Reflection of Omnicam Images

For omnicams with an effective projection point, the omnicam-image can be reconstructed from a pinhole camera perspective. [1] The centered pinhole camera coordinates are provided by the projection equation $$x' = f \frac{X}{Z} \quad (44)$$

$$y' = f \frac{Y}{Z} \quad (45)$$

The relationship between the omnicam and the pinhole camera coordinates are provided by a compression function, which can be derived from equation (27f):

$$\kappa(p) = \frac{2}{1 + \sqrt{1 + p^2}} \quad (46)$$

Figure 5:
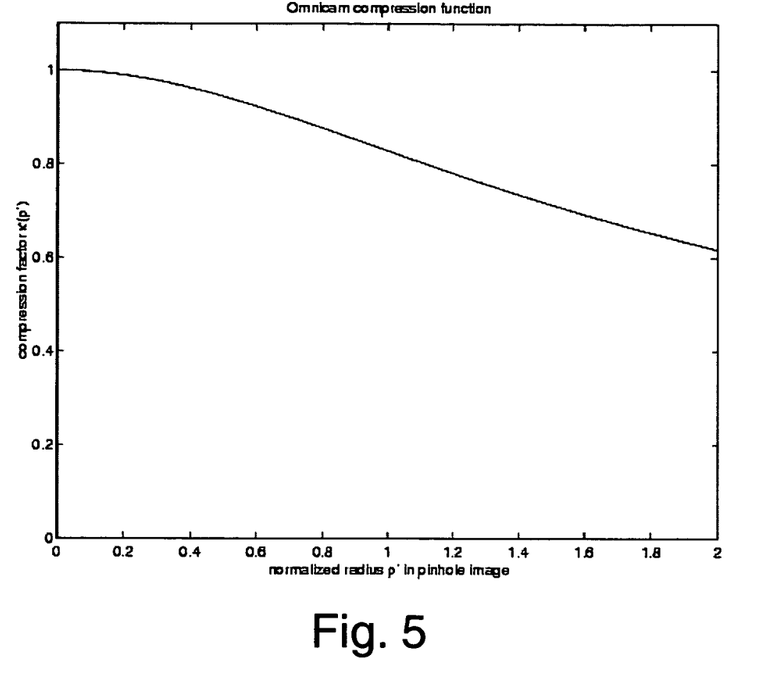
FIG. 5 shows the relationship between the coordinates of an omnicam and those of a pinhole camera.

A graph of this compression function can be seen in FIG. 5.

The omnicam image position (x,y) corresponds to the centered pinhole camera coordinates (x',y') according to $$x = \kappa\left(\frac{\sqrt{x'^2 + y'^2}}{f}\right) x' \quad (47)$$

$$y = \kappa\left(\frac{\sqrt{x'^2 + y'^2}}{f}\right) y' \quad (48)$$

The inverse transformation is $$x' = \frac{4f^2}{4f^2 - x^2 - y^2} x \quad (49)$$

$$y' = \frac{4f^2}{4f^2 - x^2 - y^2} y \quad (50)$$

Figure 6:
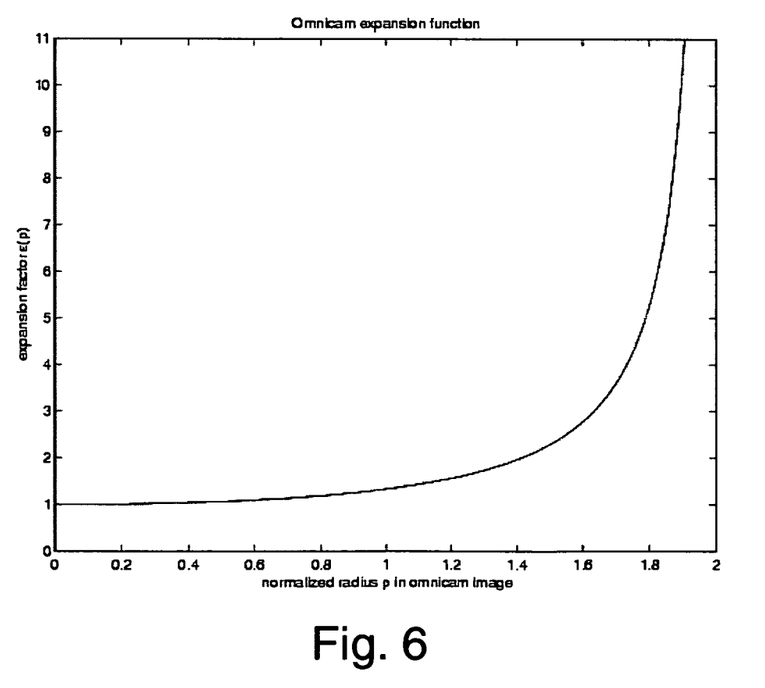
FIG. 6 shows the inverse transformation of the image position of an omnicam with reference to a pinhole camera model.

A graph of this coefficient $4/(4-\rho^2)$ is shown in FIG. 6.

Horizon and FOE

Figure 7:
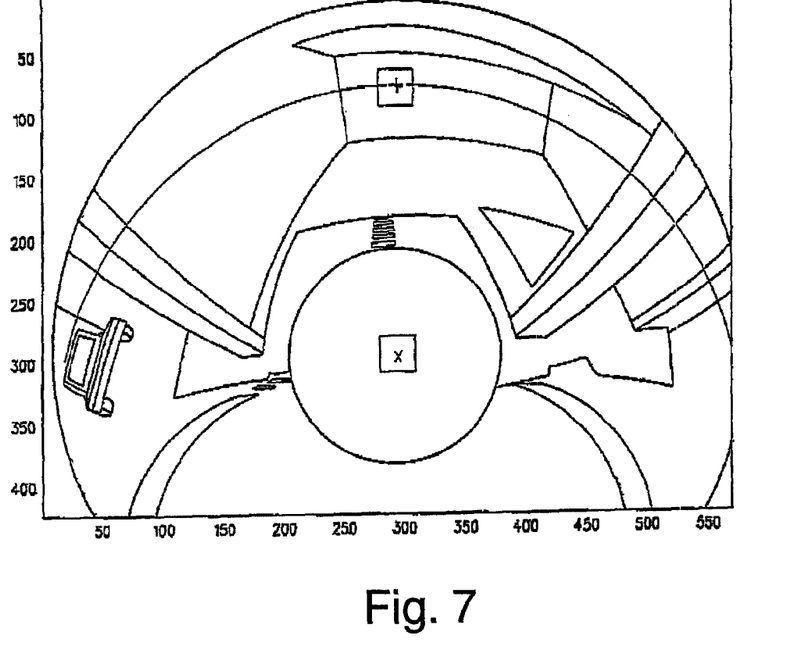
FIG. 7 shows the image recorded by an omnicam in the direction of travel, in which the horizon is illustrated.
Figure 8:
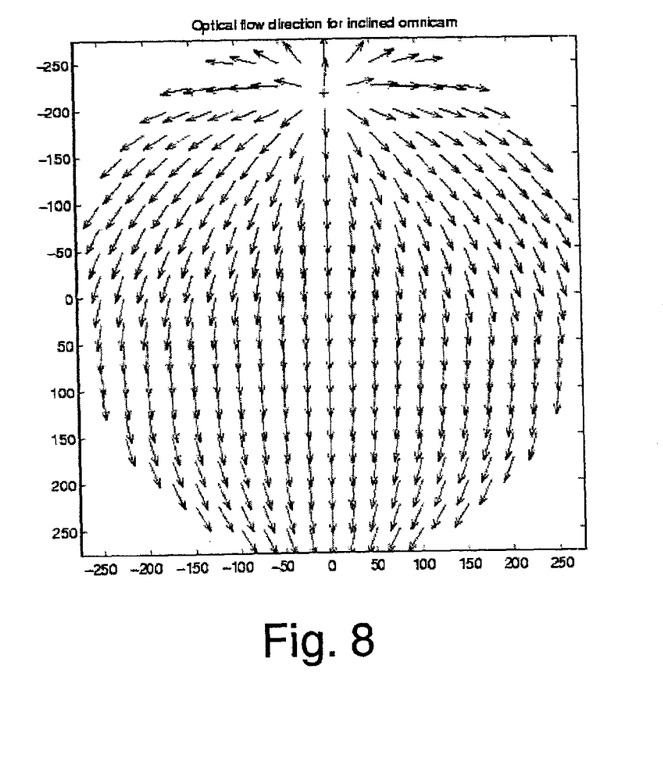
FIG. 8 shows the optical flow field of the image points within the scene.

For describing the effect of the vehicle movement in the image one uses the term horizon and expansion point (or FOE for focus of expansion). FIG. 3 shows how a tilted camera is moved along by the vehicle, which moves along a horizontal plane. The horizon is the image of a plane parallel thereto, which passes through the projection center, as shown in FIG. 7. The main point of the camera is marked with "x", the FOE with a "+", the horizon has a yellow line.

A straight line in the horizontal plane is provided by a point $p_v = (0, 0, 1)^t$ and the direction $l_v = (1, 0, 0)^t$. A normal or perpendicular in the horizontal plane is $n_v = (0, 0, 1)^t$, and has the camera coordinates $n = (0, \cos \tau, \sin \tau)^t$. As discussed above, one must distinguish between the two cases.

for camera tilt $\tau = 0$, the horizon is a straight line with $y = 0$.
for $\tau \neq 0$, the horizon is a circular arc of which the center point and radius are defined by $$x_H = 0 \quad (51)$$

$$y_H = 2f \cot \tau \quad (52)$$

$$r_H = 2f/\sin \tau \quad (53)$$

For a straight linear horizontal movement shown in FIG. 3 the FOE lies in the center of the horizon:

$$x_{FOE} = 0 \quad (54)$$

The ordinate is determined for $\tau \neq 0$ $$y_{FOA} = y_H - r_H = -2f \tan\frac{\tau}{2} \quad (55)$$

as follows also from Formula (26).

In a symbolic representation of the free space by a grid pattern it is precisely the grid elements which are comprised of perpendicular and horizontal segments of straight lines $p_i$, $l_i$, according to the discussion regarding Formula (29) through (34), wherein the $p_i$ represents the model point-of-space points on the straight line segments, and $l_i$ respectively represent one of two unity vectors in the direction of the corresponding grid elements. These straight line segments are, as discussed, transformed into circular arc segments on the image sensor surface and these are represented as grid patterns. The locationally fixed representation of the symbolic grid elements are then accomplished thereby, that in the case of a movement along the segment s in the longitudinal direction of the vehicle—measured for example by a rotary encoder or a speed sensor at the wheel—all model points or space points $l_i$ are displaced or moved along the segment s opposite to the direction of travel.

$$p_i^{new} = p_i - s*e$$

wherein e represents a unity vector in the vehicle longitudinal direction in the camera coordinate system.

It is further useful, that the driver need not continuously move his vehicle in order to determine a danger of objects in the described manner on the basis of the movement pattern in the image. It should be made possible to him, for example by operating a switch, to generate a repetition of the last movement sequence on the display system. This can for example be the image material of the last five-meter travel segment with "driving tube" included, shown in an endless loop.

Possible design or presentation elements of the symbolic driving tube, which satisfy the requirements for the clear geometric structure and the transparency described in the last section are for example the representation of the edge boundaries by means of a grid pattern, a sequence of columns or a checkerboard pattern.

Figure 1:
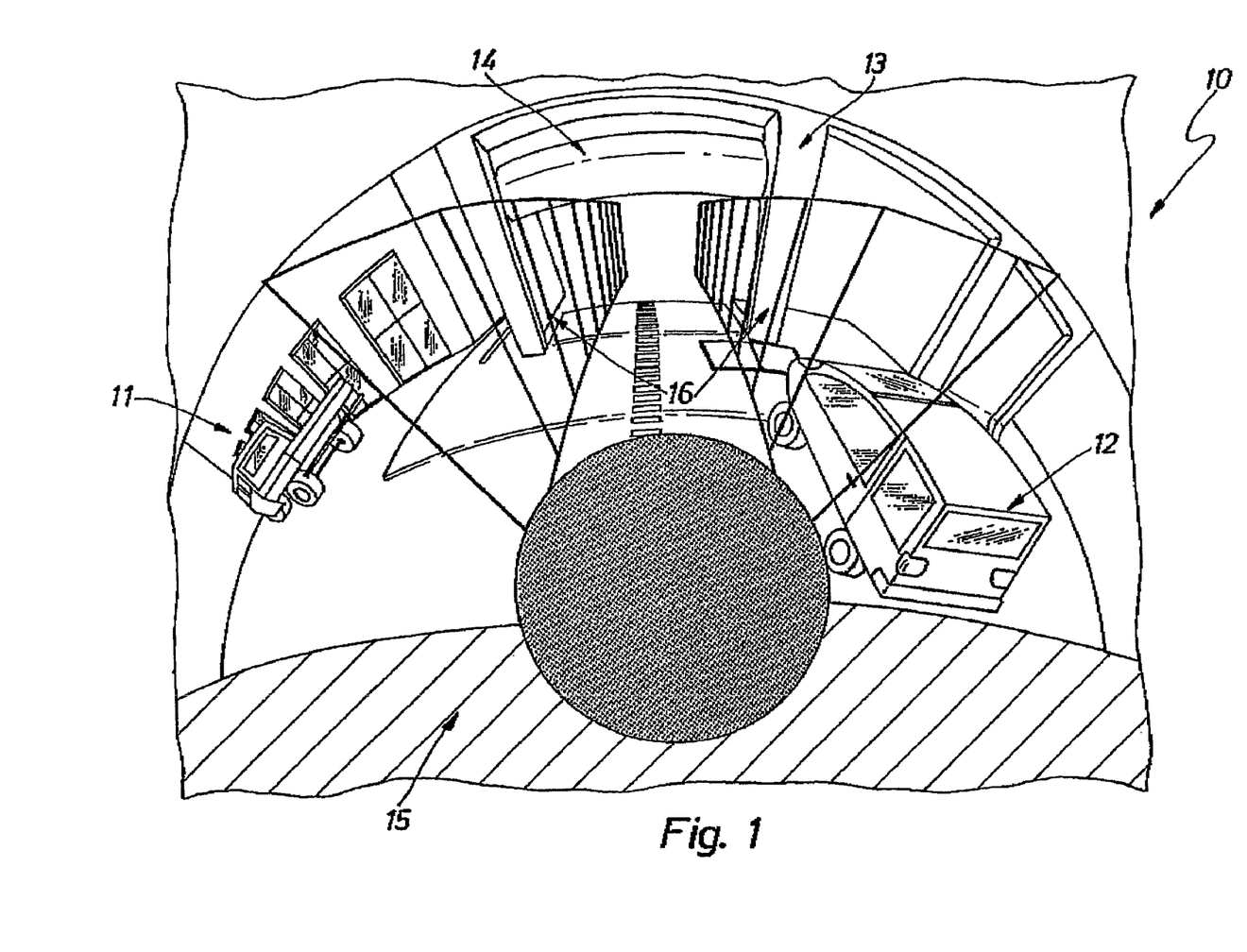
FIG. 1 shows an image scene (10) in which the edge borders of the free space are visualized by superimposition of walls represented in symbolic form (16).

FIG. 1 shows an image scene 10, in which the edge boundaries of the free space are visualized by superimposing symbolic represented walls 16. The image data associated with the rear scene are distorted with the advantageous employment of a catadiopoteric camera. For a vehicle operator however, the essential object in the environment, such as for example the vehicle 11 and 12 as well as the garage 13 with the roll-up door 14 is very easy to recognize and understand. In the shown example there is formed, by the use of the catadiopoteric camera, the part area 15 lying in the direction of travel of the own vehicle at the lower edge of the displayed or presented image data. Such a display has the advantage, that the vehicle operator is able to observe those areas of the vehicle having the greatest potential of collision danger.

Without superimposing upon the image data the symbolic walls 16 it would be difficult for the vehicle operator however to estimate whether he can drive into the garage 13 with his vehicle, without bumping against the partially lowered roll-up door 14. The symbolic walls show him however that for his vehicle there is sufficient free space below the roll-up door, in order to drive into the garage without collision. From the straight forward progression of the symbolic walls, the vehicle operator can derive that his vehicle is optimally oriented for driving into the garage, and see that there is no longer any need for any essential steering correction during operating the vehicle.

Figure 2:
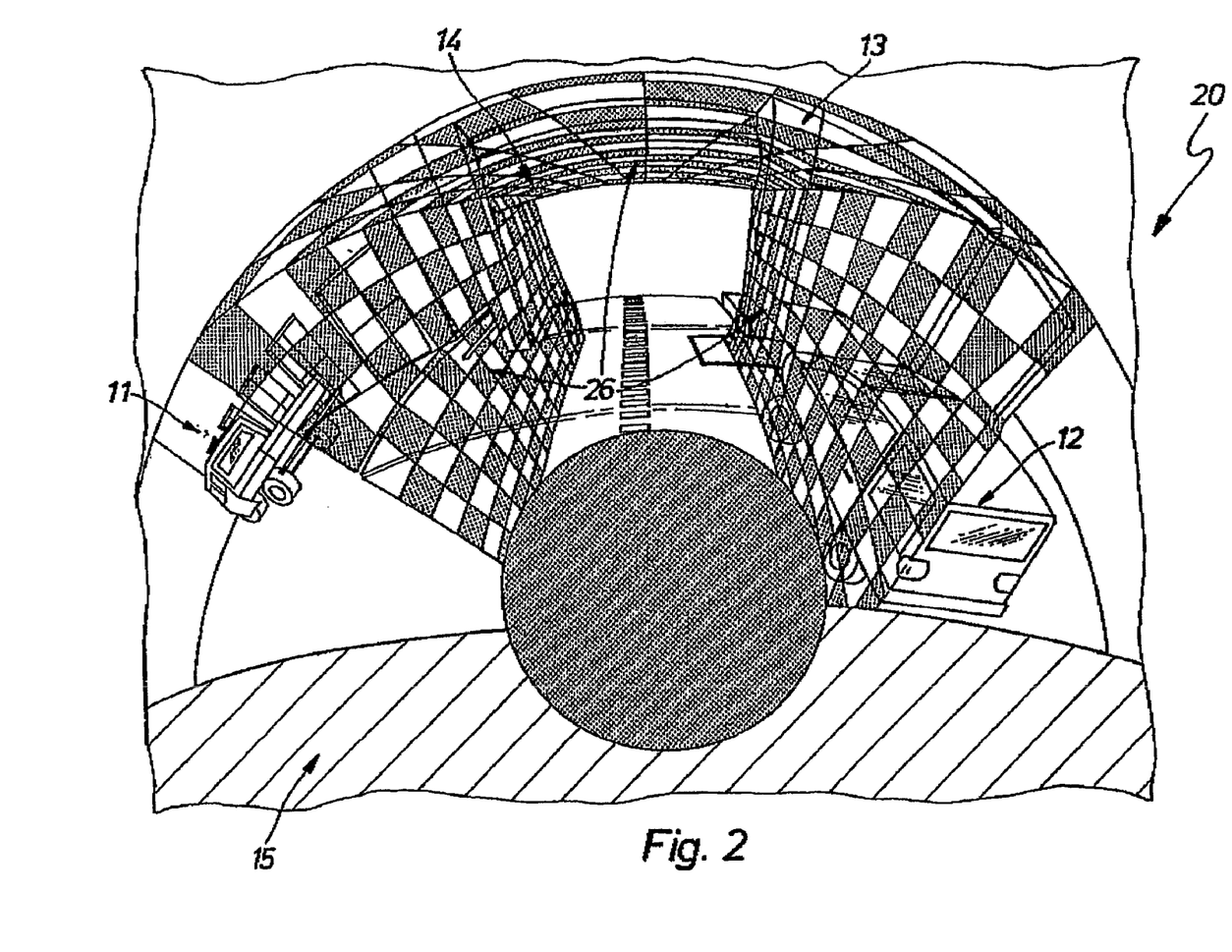
FIG. 2 shows an image scene (20) identical to FIG. 1, wherein here the edge borders of the free space are visualized by superimposition of a winding symbolic represented virtual driving tube (26) with checkerboard pattern.

FIG. 2 shows an image scene (20) identical to FIG. 1, wherein here the edge boundaries of the free space are visualized by superimposing a symbolic represented virtual driving tube (26) with checkerboard pattern. By the use of a checkerboard pattern for accentuating the edge boundaries, the observation of the image scene on the display becomes clear, and the movement of the own vehicle is particularly understandable. This is particularly advantageous in the situation where driving must occur at slow speed due to close proximity.

By the use of clear geometric structures in the already discussed example of the symbolic driving tube, in combination with a registering lens, for example a catadiopoteric lens, a further advantage is achieved: by the reference structure of the symbolic driving tube displayed in the same manner, it becomes substantially easier for the driver to evaluate and take into consideration without having to think of the distortions of the lens. This is particularly conspicuous in the examples shown in FIGS. 1 and 2, at the edge of the image to the right and left, in which the view onto a diagonal drive path is to be seen. For example, the warped boundaries of the rectangular driving tube shown in FIG. 2 facilitates the interpretation, as to which of the elements lying above and below are in the scene. In the distortion shown here the street lies "inside" as the lower element, and the sky lies at the outer edge of the circular-shaped representation.

In particularly advantageous manner the invention is suited for rear-space monitoring during a re-orienting or repositioning operation of a motor vehicle. Herein the rearward space is often not directly observable by the vehicle operator, so that he is dependent upon a particularly clear depiction of the environment and the interaction of his vehicle therewith.

A further supporting and assisting of the driver during repositioning or re-orientation can be achieved, when the above described comparison of the movement of a locationally fixed driving tube with the actual movement of objects in the image are no longer left to him on the basis of how things appear, but rather are undertaken automatically by a computation unit. This is possible with the utilization of, for example, processes known in robotics for the comparison of the measured optical flow in the image with the calculated optical flow of a model vector field, here the model of a geometically defined driving tube corresponding to FIG. 13.

The algorithm necessary for the automatic evaluation and comparison of the optical flow is described in the following by way of example for the use of a camera system comprised of a catadiopoteric camera (omnicam) with a parabolic mirror. Of course these basic principles can, in analogous manner, also be applied to other camera systems and other optical characteristics.

Optical Flow

General Optical Flow

The derivative of the omnicam projection Equation (27f) is $$\dot{x} = \frac{2f \cdot (R \cdot (R+Z) - X^2)}{R \cdot (R+Z)^2} \dot{X} - \frac{2fXY}{R \cdot (R+Z)^2} \dot{Y} - \frac{2fX}{R \cdot (R+Z)} \dot{Z} \quad (56)$$

$$\dot{y} = -\frac{2fXY}{R \cdot (R+Z)^2} \dot{X} + \frac{2f \cdot (R \cdot (R+Z) - Y^2)}{R \cdot (R+Z)^2} \dot{Y} - \frac{2fY}{R \cdot (R+Z)} \dot{Z} \quad (57)$$

If one again introduces the projection Equation (27f), there results $$\dot{x} = \left(z + \frac{y^2}{2f}\right)\frac{\dot{X}}{2} - \frac{xy}{2f}\frac{\dot{Y}}{R} - x\frac{\dot{Z}}{R} \quad (58)$$

$$\dot{y} = -\frac{xy}{2f}\frac{\dot{X}}{2} + \left(z + \frac{x^2}{2f}\right)\frac{\dot{Y}}{R} - y\frac{\dot{Z}}{R} \quad (59)$$

Optical Flow for Tilted Camera

For a tilted camera as in FIG. 3 the movement is described by Equation (5f). If one introduces this into the Equation (58f) above, there results $$\dot{x} = \frac{Vx}{R} \cdot \left(\cos\tau - \frac{y}{2f}\sin\tau\right) \quad (60)$$

$$\dot{y} = \frac{V}{R} \cdot \left(y\cos\tau + \left(z + \frac{x^2}{2f}\right)\sin\tau\right) \quad (61)$$

Therein one must take into consideration that R and z depend upon the image position. In greater detail, the vertical flow says that $$\dot{y} = \frac{V}{R} \cdot \left(y\cos\tau + \frac{4f^2 + x^2 - y^2}{4f}\sin\tau\right) \quad (62)$$

The distance $R(\chi,\gamma)$ modulates the horizontal and vertical flow with the same front or lead factor. Thus $R(\chi,\gamma)$ influences only the length of the flow vectors, however not their direction. As shown, the direction of flow is determined only by the camera movement, that is, through the bearing or location of the point of expansion. For this translation movement the direction of the flow vectors is also independent of the depth structure of the environment.

Optical Flow of the Camera in the Direction of Travel

For an omnicam, of which the axis is oriented in the direction of travel, the flow Equation (60f) is simplified:

$$\dot{x} = \frac{Vx}{R} \quad (63)$$

$$\dot{y} = \frac{Vy}{R} \quad (64)$$

This is very similar to the field of flow of the pinhole camera. The only difference is comprised in that the denominator R, in the case of the pinhole camera, would be Z. In both camera types the flow field is in this case purely radial, that is the flow vector $(\dot{x}, \dot{y})$ is parallel to the radius vector $(x,y)$, also when $R(x,y)$ changes over the image. For a front parallel wall with a depth Z=c there follows from Equation (38)

$$R(x, y) = \frac{4f^2 + x^2 + y^2}{4f^2 - x^2 - y^2} c \quad (65)$$

Figure 9:
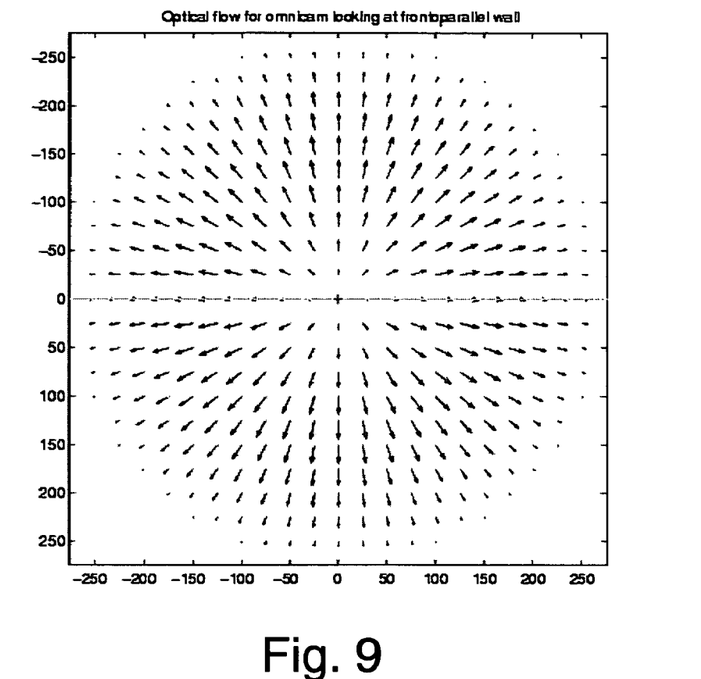
FIG. 9 shows the optical flow field for a wall, which rises perpendicular to the optical axis of the omnicam, in the case of movement along the optical axis.

Thus the corresponding flow field appears as shown in FIG. 9:

$$\dot{x} = \frac{Vx}{c} \cdot \frac{4f^2 - x^2 - y^2}{4f^2 + x^2 + y^2} \quad (66)$$

$$\dot{y} = \frac{Vy}{c} \cdot \frac{4f^2 - x^2 - y^2}{4f^2 + x^2 + y^2} \quad (67)$$

Optical Flow of a Vertical Side Wall

One then takes into consideration again a camera with tilt angle τ at the vehicle as in FIG. 3. The vertical side wall parallel to the direction of travel is determined by x=a. The distance of the wall according to Equation (39) can be utilized in the general flow Equation (60f):

$$\dot{x} = \frac{V}{a} \cdot \left(\cos\tau - \frac{y}{2f}\sin\tau\right) \cdot \frac{x^2}{2f-z} \quad (68)$$

$$\dot{y} = \frac{V}{a} \cdot \left(y\cos\tau + \left(z + \frac{x^2}{2f}\right)\sin\tau\right) \cdot \frac{x}{2f-z} \quad (69)$$

In greater detail, this means $$\dot{x} = \frac{V}{a} \cdot \left(\cos\tau - \frac{y}{2f}\sin\tau\right) \cdot \frac{4fx^2}{4f^2 + x^2 + y^2} \quad (70)$$

$$\dot{y} = \frac{V}{a} \cdot \left(\cos\tau + \frac{4f^2 + x^2 - y^2}{4fy}\sin\tau\right) \cdot \frac{4fxy}{4f^2 + x^2 + y^2} \quad (71)$$

Figure 10:
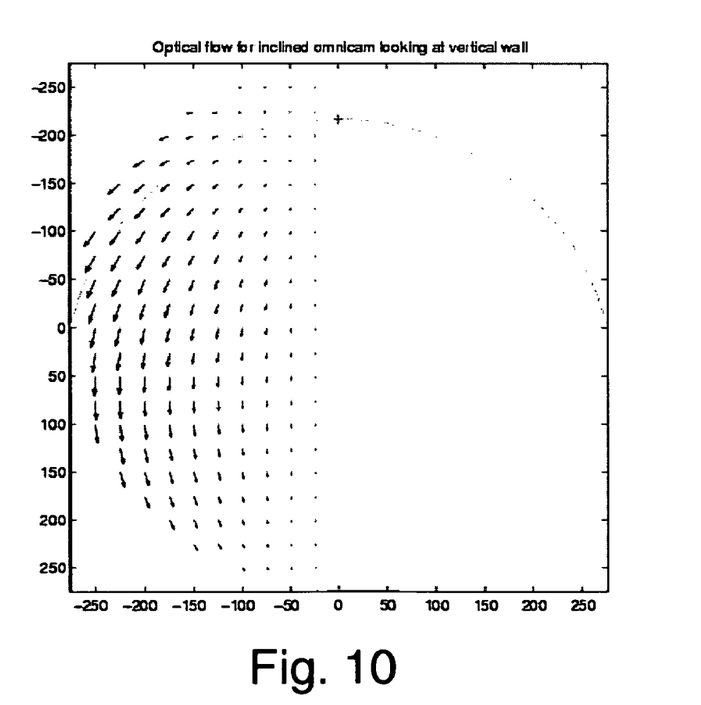
FIG. 10 shows the optical flow of a sidewall during the movement of the vehicle.

This is illustrated in FIG. 10.

Optical Flow of a Horizontal Plane

A horizontal plane (for example a street or a garage roof) is defined by $Y_V=b$. The wall distance according to Equation (42) can be introduced into the general flow Equation (60f):

$$\dot{x} = \frac{Vx}{b} \cdot \left(\cos\tau - \frac{y}{2f}\sin\tau\right) \cdot \frac{y\cos\tau + z\sin\tau}{2f-z} \quad (72)$$

$$\dot{y} = \frac{V}{b} \cdot \left(y\cos\tau + \left(z + \frac{x^2}{2f}\right)\sin\tau\right) \cdot \frac{y\cos\tau + z\sin\tau}{2f-z} \quad (73)$$

$$(74)$$

In greater detail this thus means $$\dot{x} = \frac{Vx}{b} \cdot \left(\cos\tau - \frac{y}{2f}\sin\tau\right) \cdot \frac{4fy\cos\tau + (4f^2 - x^2 - y^2)\sin\tau}{4f^2 + x^2 + y^2}$$

$$\dot{y} = \frac{Vy}{b} \cdot \left(\cos\tau + \frac{4f^2 + x^2 - y^2}{4fy}\sin\tau\right) \cdot \frac{4fy\cos\tau + (4f^2 - x^2 - y^2)\sin\tau}{4f^2 + x^2 + y^2}$$

Figure 11:
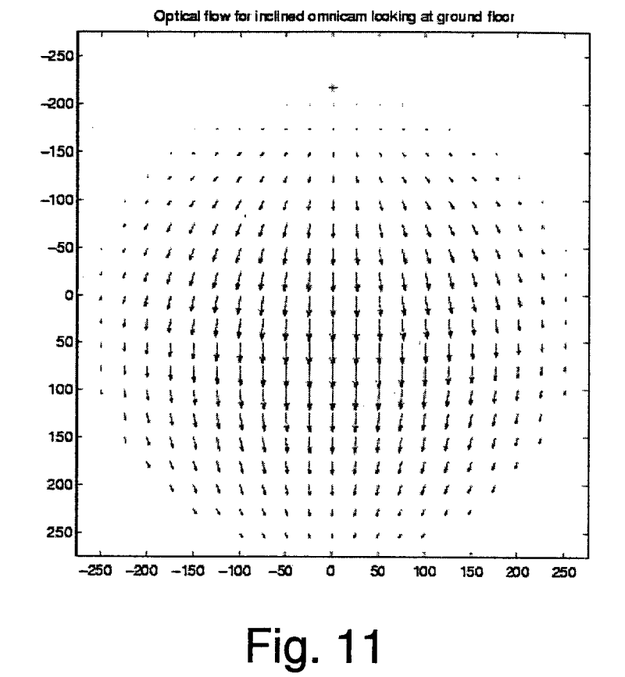
FIG. 11 shows the optical flow of a horizontal plane of the movement of the vehicle.

This is illustrated in FIG. 11.

For simplification, one can employ the third binomial series:

$$\dot{x} = \frac{Vx}{b} \cdot \left(\cos\tau - \frac{y}{2f}\sin\tau\right) \cdot \frac{4fy\cos\tau + (4f^2 - x^2 - y^2)\sin\tau}{4f^2 + x^2 + y^2} \quad (75)$$

$$\dot{y} = \frac{V}{4fb} \cdot \frac{(4fy\cos\tau + (4f^2 - y^2)\sin\tau)^2 - x^4\sin^2\tau}{4f^2 + x^2 + y^2} \quad (76)$$

Optical Flow of a Corridor

Figure 12:
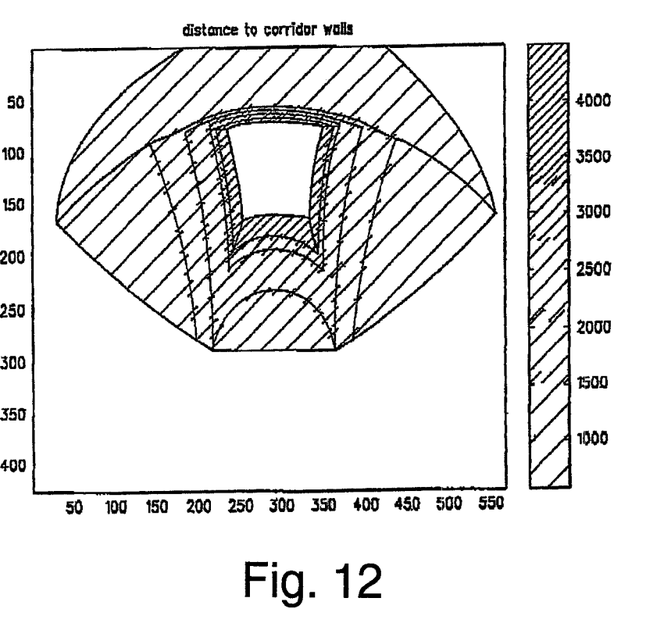
FIG. 12 shows the depth map of a corridor.

FIG. 12 shows the depth map of a corridor. The side columns show the colors employed for encoding depth. The depth is calculated according to Equation (39) for the vertical walls and according to Equation (42) for the horizontal floor and the ceiling.

Figure 13:
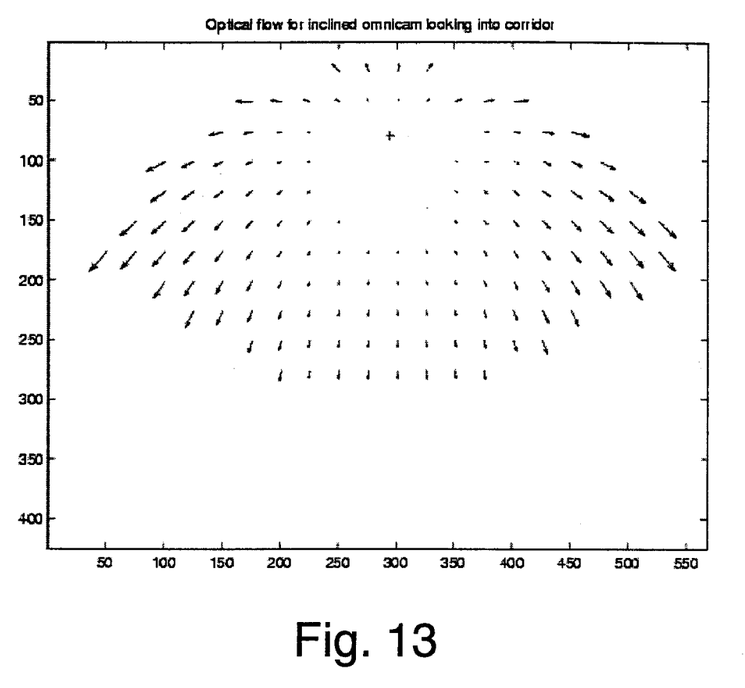
FIG. 13 shows the optical flow for the corridor of FIG. 12.
Figure 14:
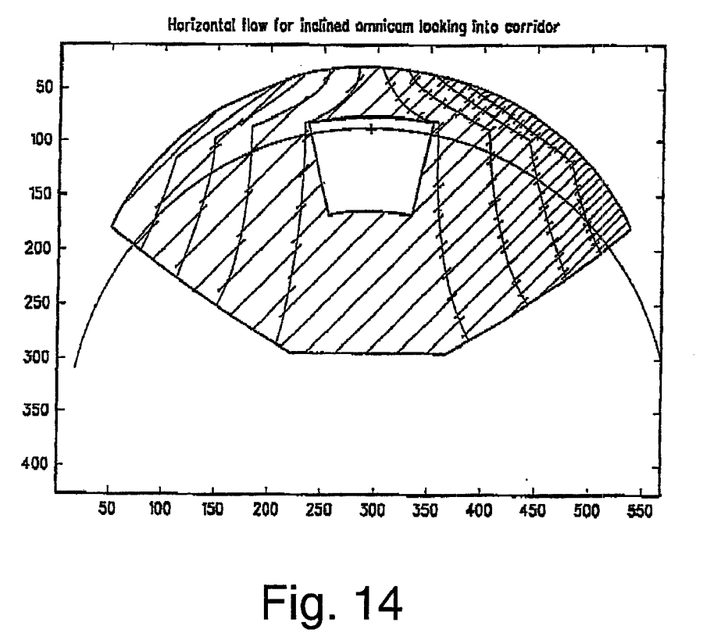
FIG. 14 shows, color-encoded, the flow field for the horizontal flow shown in FIG. 13.
Figure 15:
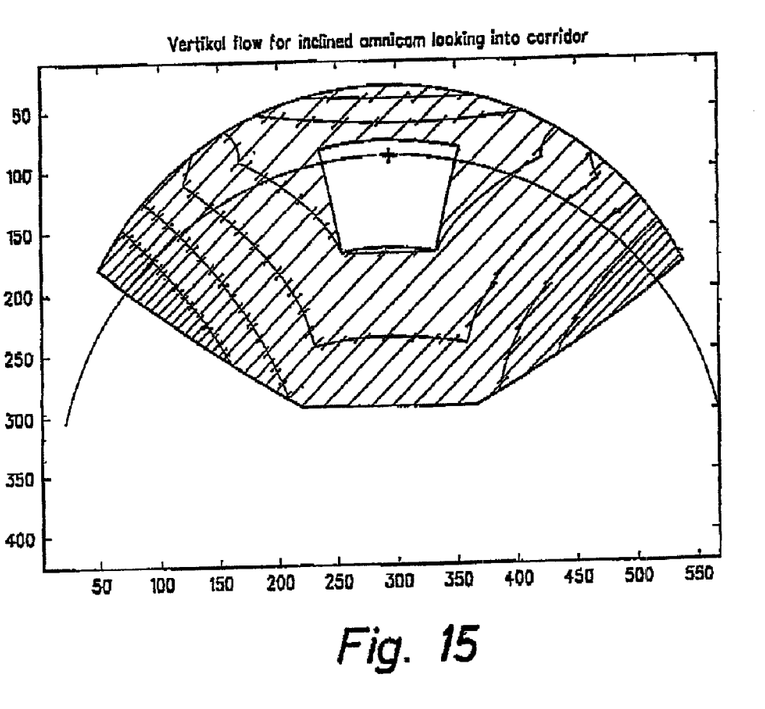
FIG. 15 shows, color-encoded, the flow field for the vertical flow shown in FIG. 13.

FIG. 13 shows the theoretical expected flow for this corridor. It can also be calculated according to Equation (70f) for the vertical walls and Equation (75f) for the floor and ceiling. Horizon and FOE are marked as above as the yellow circular arc or, as the case may be, a plus sign. FIGS. 14 and 15 show the same flow field as color encoded images respectively for the horizontal and vertical flow.

Those locations in the image, in which the model flow is less then the actual measured flow, are potential collision candidates and are displayed as such to the vehicle operator in a noticeable or standout color, and in the case of sufficient magnitude can also be employed as trigger for generating a warning signal, for example an acoustic warning signal.

Figure 16:
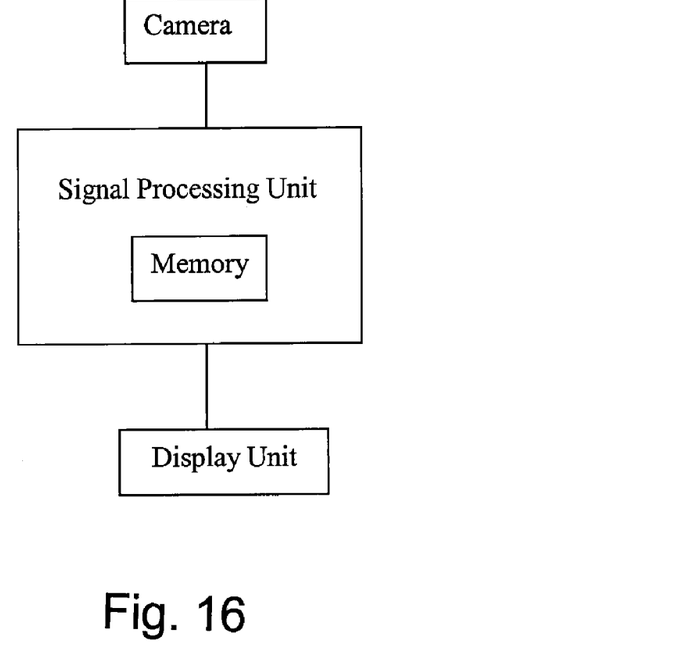
FIG. 16 schematically shows a device for monitoring the free space in the direction of travel of a vehicle according to the present invention.

FIG. 16 schematically shows a device for monitoring the free space in the direction of travel of a vehicle according to the present invention.

The invention claimed is:

1. A process for monitoring the free space in the direction of travel of a vehicle, comprising acquiring image data of the vehicle environment in the direction of travel using a camera system, additionally, on the basis of operating parameters and dimensions of the vehicle, pre-calculating a three dimensional free space required for unimpeded travel of the vehicle in a signal processing unit, and displaying to the operator of the vehicle at least the part of the acquired image data corresponding to the pre-calculated required free space, wherein the display of the image data occurs essentially as it would appear from the perspective of the operator of the vehicle directly viewing the vehicle environment in the direction of travel, wherein at least the image data associated with the three dimensional free space is subjected to a further processing, wherein as a result of this further processing the vehicle operator is informed with regard to whether or not sufficient free space is available for unimpeded travel, wherein the informing of the vehicle operator with regard to the existence of a sufficient free space occurs by the pictorial display of at least a part of the further processed image data, wherein the displayed image data has superimposed a symbolic representation of the edge boundaries of the required free space as determined by the pre-calculations in the signal processing unit, and wherein the edge boundaries are visualized by the display of a grid, a sequence of columns or a checkerboard pattern.

2. The process according to claim 1, further comprising taking into consideration dynamic changes over time taking place in the image data during further processing.

3. The process according to claim 1, wherein the informing of the vehicle operator in the case that sufficient free space is not available for unimpeded travel occurs by warning means, wherein said warning means are optical, acoustic or haptic perceivable signal providers.

4. The process according to claim 1, wherein the informing of the vehicle operator in the case that sufficient free space is no longer available for an unimpeded travel occurs by pictorial display of at least a part of the further processed image data, wherein, in these image data, those objects which are located in an impeding manner in the free space required for the travel are represented enhanced or highlighted above the other image objects.

5. The process according to claim 4, wherein the enhancement occurs in such a manner that the objects which are located in an impeding manner in the free space required for the travel have symbols superimposed thereupon, which symbols represent the direction of travel and/or speed of movement of said objects.

6. The process according to claim 1, wherein the symbolic representation of the edge boundaries occurs by symbolic representation of walls.

7. The process according to claim 1, wherein the symbolic display of the edge boundaries occurs by the symbolic representation of walls and a ceiling area and/or floor area, forming a tube or tunnel.

8. The process according to claim 1, wherein the wall area and/or ceiling area and/or the floor area is so designed that it has a geometric distinct and unambiguously recognizable structure, permits a "through view" to the video scene lying therebehind, and is so calculated, that it appears to be standing still even while the vehicle is moving in the longitudinal direction.

9. The process according to claim 1, further comprising recording the scene displayed to the operator of the vehicle and intermediately storing such for at least a specified elapsed time interval or for a particular traveled-through vehicle path, such that said stored information can be called up by the vehicle operator for repeated display.

10. The process according to claim 1, wherein the camera image data having superimposed thereon the edge boundaries of the required free space are supplied to a video processing process based on optical flow, which compares the movement of the spatially-fixed edge boundaries in the image data with the actual movement of objects in the image, wherein those objects in the image, for which the model flow is less than the actual measured flow, are assessed as potential collision objects.

11. The process according to claim 10, wherein in the case of the presence of a potential collision object, this object is optically accentuated or highlighted, and/or results in a warning being given to the vehicle operator via a warning signal.

12. The process according to claim 11, wherein the object is optically accentuated or highlighted with color.

13. A device for monitoring the free space in the direction of travel of a vehicle, including:

a camera system for acquiring image data from the vehicle environment in the direction of travel of the vehicle, a signal processing unit, which is in communication with sensors for detecting operating parameters of the vehicle and which includes a memory in which data is recorded regarding dimensions of the vehicle, the signal processing unit pre-calculating a three dimensional free space required for unimpeded travel of the vehicle on the basis of the operating parameters and the dimensions of the vehicle, a display unit in communication with the signal processing unit, for displaying to the operator of the vehicle at least that part of the acquired image data corresponding to the pre-calculated required three-dimensional free space, wherein the displayed image data has superimposed a symbolic representation of the edge boundaries of the required free space as determined by the pre-calculations in the signal processing unit, and wherein the edge boundaries are visualized by the display of a grid, a sequence of columns or a checkerboard pattern, wherein the memory associated with the signal processing unit is so designed and arranged, that a number of data sets are recorded in the memory regarding different vehicle dimensions, each of which can be specifically selected and made available to the signal processing unit by a means for specific selection of a set of data stored in memory, and/or the memory is provided with a means via which the at least one data set stored in memory can be changed.

14. The device according to claim 13, wherein the means for specific selection of a set of data stored in memory include a keypad operable by the vehicle operator.

15. The device according to claim 13, wherein the means for changing the at least one set of data stored in memory includes a communication device for the wireless transmission of data.

16. The device according to claim 13, wherein the camera system includes at least one catadioptric camera.

17. The device according to claim 13, wherein the device includes a memory for intermediate storage of at least a part of the image data displayed to the operator of the vehicle, and wherein means is provided via which the vehicle operator can call up this intermediate stored image data for repeated viewing.

18. The device according to claim 13, wherein the image data has edge boundaries of the required free space superimposed thereon and the device includes a unit for image processing on the basis of optical flow, via which the image data having the edge boundaries of the required free space superimposed thereon can be processed to the extent that movement of the positionally fixed edge boundaries in the image can be compared with the actual movement of objects in the image, so that those locations in the image, at which the optical flow is less than the actual measured flow, can be assessed as potential collision objects.

19. The device according to claim 18, wherein the unit for image processing is in communication with a display for the vehicle operator and/or a warning signal generator, such that a potential collision object can be accentuated in the represented image or the vehicle operator can be warned of these objects.

20. A process for monitoring the space behind a vehicle during backing-up or repositioning of the vehicle, comprising:

acquiring image data of the vehicle environment in the direction of travel using a camera system, additionally, on the basis of operating parameters and dimensions of the vehicle, pre-calculating a three dimensional free space required for unimpeded travel of the vehicle in a signal processing unit, and displaying to the operator of the vehicle at least the part of the acquired image data corresponding to the pre-calculated required free space, wherein the display of the image data occurs essentially as it would appear from the perspective of the operator of the vehicle directly viewing the vehicle environment in the direction of travel, wherein at least the image data associated with the three dimensional free space is subjected to a further processing, and wherein as a result of this further processing the vehicle operator is informed with regard to whether or not sufficient free space is available for unimpeded travels, wherein the informing of the vehicle operator with regard to the existence of a sufficient free space occurs by the pictorial display of at least a part of the further processed image data, wherein the displayed image data has superimposed a symbolic representation of the edge boundaries of the required free space as determined by the pre-calculations in the signal processing unit, and wherein the edge boundaries are visualized by the display of a grid, a sequence of columns or a checkerboard pattern.

21. A device for monitoring the space behind a vehicle during backing-up or repositioning of the vehicle, said device including:

a camera system for acquiring image data from the vehicle environment in the direction of travel of the vehicle, a signal processing unit, which is in communication with sensors for detecting operating parameters of the vehicle and which includes a memory in which data is recorded regarding dimensions of the vehicle, the signal processing unit pre-calculating a three dimensional free space required for unimpeded travel of the vehicle on the basis of the operating parameters and the dimensions of the vehicle, a display unit in communication with the signal processing unit, for displaying to the operator of the vehicle at least that part of the acquired image data corresponding to the pre-calculated required three-dimensional free space, wherein the displayed image data has superimposed a symbolic representation of the edge boundaries of the required free space as determined by the pre-calculations in the signal processing unit, and wherein the edge boundaries are visualized by the display of a arid, a sequence of columns or a checkerboard pattern, wherein the memory associated with the signal processing unit is so designed and arranged, that a number of data sets are recorded in the memory regarding different vehicle dimensions, each of which can be specifically selected and made available to the signal processing unit, and/or the memory is provided with a means via which the at least one data set stored in memory can be changed.

* * * * *